United States Patent [19]

Hsu et al.

[11] Patent Number: 5,633,086

[45] Date of Patent: May 27, 1997

[54] FRICTION AND WEAR RESISTANT COATING FOR TITANIUM AND ITS ALLOYS

[75] Inventors: Stephen M. Hsu, Germantown; Jia-Ming Gu, Adelphia, both of Md.

[73] Assignee: The United States of America as represented by the Secretary of Commerce, Washington, D.C.

[21] Appl. No.: 455,212

[22] Filed: May 31, 1995

[51] Int. Cl.$^6$ ............................................. B32B 5/16
[52] U.S. Cl. .................... 428/404; 427/215; 427/221; 427/409; 427/410; 427/419.2; 427/419.5; 428/407; 428/689; 428/701; 428/702
[58] Field of Search .................. 428/328, 329, 428/403, 407, 404, 689, 701, 702; 427/215, 221, 409, 410, 419.2, 419.5

[56] References Cited

U.S. PATENT DOCUMENTS

| | | | |
|---|---|---|---|
| 3,787,229 | 1/1974 | Rudness | 428/148 |
| 4,329,238 | 5/1982 | Mitrofanova et al. | 252/12 |
| 4,794,680 | 1/1989 | Meyerhoff et al. | 29/132 |
| 5,085,911 | 2/1992 | Kato et al. | 428/65 |
| 5,160,243 | 11/1992 | Herzner et al. | 416/220 R |
| 5,192,232 | 3/1993 | Shetty et al. | 623/16 |
| 5,213,470 | 5/1993 | Lundquist | 416/9 |
| 5,281,484 | 1/1994 | Tank | 428/552 |
| 5,320,686 | 6/1994 | Johanson et al. | 148/238 |
| 5,326,362 | 7/1994 | Shetty et al. | 623/66 |

*Primary Examiner*—Hoa T. Le
*Attorney, Agent, or Firm*—Larson and Taylor

[57] ABSTRACT

For titanium and titanium alloys in tribological applications under boundary lubrication conditions, there are employed epoxy coatings adhered to the surface of the titanium or titanium alloy by a titanium oxide primer layer. The anti-wear properties of the epoxy coating can be improved by incorporation of an anti-wear filler such as diamond powder. These coatings improve the friction coefficient and anti-wear properties of the titanium and titanium alloys.

19 Claims, 1 Drawing Sheet

FRICTION AND WEAR RESISTANT COATING FOR TITANIUM AND ITS ALLOYS

FIELD OF THE INVENTION

The present invention relates to the application of an epoxide polymer as a friction and wear-resistant coating for titanium and its alloys to be employed under boundary lubrication conditions.

BACKGROUND OF THE INVENTION

Titanium and its alloys are widely used in the aerospace and machinery industries, as well as in biomedical prosthesis devices due to its high strength, light weight, high modulus and corrosion resistance. However, application of titanium and its alloys in tribological applications under load such as bearings and bushings is impeded by the high friction coefficient of titanium and its alloys which may result in the apparatus seizing up. Compared to iron, the intrinsically low yield strength of titanium makes it difficult to lubricate with conventional lubricant chemistry. The relatively weak titanium-to-titanium bond is responsible for its relatively low hardness and low yield strength. For example, the enthalpy of sublimation, which is an approximation of the titanium-to-titanium bond energy is 78.94 kJ/Mol, compared with 103.87 kJ/Mol for iron, for example.

For titanium, the hardness, Young's Modulus and tensile strength are 60 DPN (diamond pyramid number), $1.16 \times 10^{11}$ $N/m^2$ and 20 $N/mm^2$, respectively, while those for iron are 150 DPN, $2 \times 10^{11}$ $N/m^2$ and 540 $N/mm^2$, respectively. In addition, most of the conventional anti-wear additives such as phosphorous compounds may be corrosive to titanium and its alloys because of the high oxidation potential of titanium. Further, theoretical calculations have shown that metals with low tensile and shear strengths can exhibit high friction coefficients and high rates of material transfer to non-metallic surfaces, leading to severe adhesive wear.

Halogenated hydrocarbons have been shown to be somewhat effective in the lubrication of titanium and its alloys. Further, chlorinated compounds were identified for the lubrication of titanium but the effectiveness of these compounds was marginal and the lubrication mechanism was not understood. Iodomethane was also suggested as a lubricant for titanium and showed a friction coefficient of 0.16 for titanium sliding on itself. A titanium halide surface layer may be responsible for the reduction of the friction coefficient since titanium iodide, generated by exposure of titanium to iodine, has been demonstrated to reduce the friction coefficient from 1.2 to 0.3, which coefficient remains unchanged up to a temperature of about 400° C. More recently, it was discovered that conjugated, perchlorinated hydrocarbons such as hexachloro-1,3-butadiene can reduce the friction coefficient of titanium sliding on Ti—6Al—4V down to as low as 0.1. Further, the addition of a lubricant such as polyperfluoroalkylether (PFPE) or kerosene oil, reduces the coefficient of friction and wear damage somewhat, compared with unlubricated conditions, although reaction of titanium surfaces with these lubricants, generally under high temperature conditions, can reduce lubricant performance. Furthermore, the dense titanium oxide layer which is simultaneously formed when a fresh titanium surface is exposed to air or moisture and to which the anti-corrosive capability of titanium is attributed, can be easily sheared off or transferred under tribological conditions, leading to severe corrosive wear and adhesive wear.

A simple thermal surface treatment of titanium fails to overcome its deficiencies under tribological conditions. For example, alpha-phase, the stable crystallographic form of commercially pure titanium below 883° C., cannot be surface-hardened by heat treatment. This is also true for alpha-alloys of titanium. The only treatment which has met with some success is annealing or recrystallizing the hexagonal close-packed crystal structure to eliminate residual stress caused by work-hardening.

Another potential solution to the lubrication and protection of titanium when used under tribological conditions would be the application of a wear-resistant organic or inorganic surface coating followed by a thermochemical surface treatment. Such thermochemical surface treatments include nitrating, carburizing, boriding, etc. However, these treatments also suffer from many technical difficulties often requiring a special apparatus with a high energy power source such as plasma, laser beam or ionic beam generators and such treatments often require a toxic atmosphere and high temperatures of up to 900° C. For these reasons, prior art surface coatings and thermochemical surface treatments are considered impractical for protecting the surface of titanium and its alloys for tribological applications.

Some examples of such coatings and thermochemical treatments can be found in U.S. Pat. Nos. 5,281,484 and 5,320,686. The first of these patents relates to titanium aluminide objects with a coating of a nickel-based alloy soldered under a vacuum. Such coatings are said to be wear resistant, oxidation resistant and to adhere well to the substrate. The second patent discloses the treatment of the surface of titanium or titanium alloys to provide a hard and wear resistant nitride layer with good adhesion. The nitride layer is formed by treating the titanium surface in an atmosphere of pure nitrogen gas at a temperature of 650°–1000° C. and a reduced pressure. This coating is also said to improve the friction and corrosion properties of titanium and its alloys.

Although epoxy polymers have been extensively used for coatings of metallic materials, they are infrequently employed for titanium-containing materials. One example of a coating of Ti—6Al—4V is given in the following series of articles:

a. Filbey, J. A. and Wightman, J. P., *Factors Affecting the Durability of Ti—6Al—4V/Epoxy Bonds*, J. Adhesion, 1989, 28, 1.

b. Filbey, J. A. and Wightman, J. P., *Factors Affecting the Durability of Ti—6Al—4V/Epoxy Bonds*, J. Adhesion, 1989, 28, 23.

c. Filbey, J. A. and Whiteman, J. P., *Factors Affecting the Durability of Ti—6Al—4V/Epoxy Bonds*, Adhesion (London), 1988, 12, 17.

d. Filbey, J. A. and Whiteman, J. P., *Factors Affecting the Durability of Ti—6Al—4V/Epoxy Bonds*, Adhes. Sci. Rev., 1, Proc. Annu. Program Rev./Workshop, 5th 1987, 1. Brinson, H. F.; Wightman, J. P.; Ward, T. C. Ed..

e. Roche, A.; Gaillard, F.; Romand, M.; Von Fahnestock, M., *Metal-Adhesive Bonded Systems: Adhesion Measurement Using a Three-Point Flexure Test*, J. Adhes. Sci. Technol. 1987, 1 (2), 145.

These articles report the influence of different surface pretreatment methods, including the use of a thick organic titanate layer as primer, on the durability of the titanium alloy/epoxy bonds in a three-point flexure test.

As wear-resistant fillers for epoxy coatings in general, several different materials have been employed. For example, a corundum, ceramic wool, ceramic spheres, zinc oxide, bauxite, silica sand, titanium dioxide and other materials have been employed. Further, loadings of high concentrations of diamond powder, from 30 to 85%, have been employed in epoxy resins in order to achieve particular levels of thermal conductivity.

Anti-friction coatings for titanium which comprise molybdenum disulfide are known from U.S. Pat. No. 4,329,238. These coatings are employed in the form of an anti-friction paste containing epoxy resin, molybdenum disulfide, graphite, aluminum, copper, alumosilicate and polyethylene polyamine curing agent. This paste provides low friction as well as reduced wear and extended service life to the devices coated therewith.

U.S. Pat. No. 5,160,243 discloses turbine blades provided with a wear resistant coating which includes molybdenum disulfide. The patent also mentions the potential for using a coating including Teflon®, bentonite, inorganic oxide particles and an epoxy material although no examples of this coating are given.

Accordingly, although several coatings are known for titanium and its alloys, there remains a need in the art for an anti-wear coating for titanium and its alloys which can withstand tribological conditions.

SUMMARY OF THE INVENTION

The primary object of the present invention is to provide protection from wear and surface damage for titanium and its alloys when employed in tribological applications under boundary lubrication conditions.

In order to meet this objective, the present invention provides a friction and wear resistant coated titanium or titanium alloy which includes a titanium or titanium alloy substrate, a first layer of $Ti_xO_y$ bonded to a surface of the titanium of titanium alloy substrate and a second layer comprising a cured epoxy resin bonded to the first layer. It has been found that these coatings significantly reduce the wear and the coefficient of friction for titanium and its alloys when its slides on an uncoated harder alloy. In this manner the durability of the protected titanium or titanium alloy can be significantly improved.

Another object of the present invention is to provide methods for protecting titanium and its alloys from severe wear and high friction. This objective is met by forming a $Ti_xO_y$ layer on the surface of the titanium or titanium alloy, coating the $Ti_xO_y$ layer with a composition comprising an epoxy resin and curing the epoxy resin with an epoxy resin curing agent.

Other objects and advantages of the present invention will be apparent from the detailed description which follows.

DETAILED DESCRIPTION OF THE INVENTION

Figure 1A:
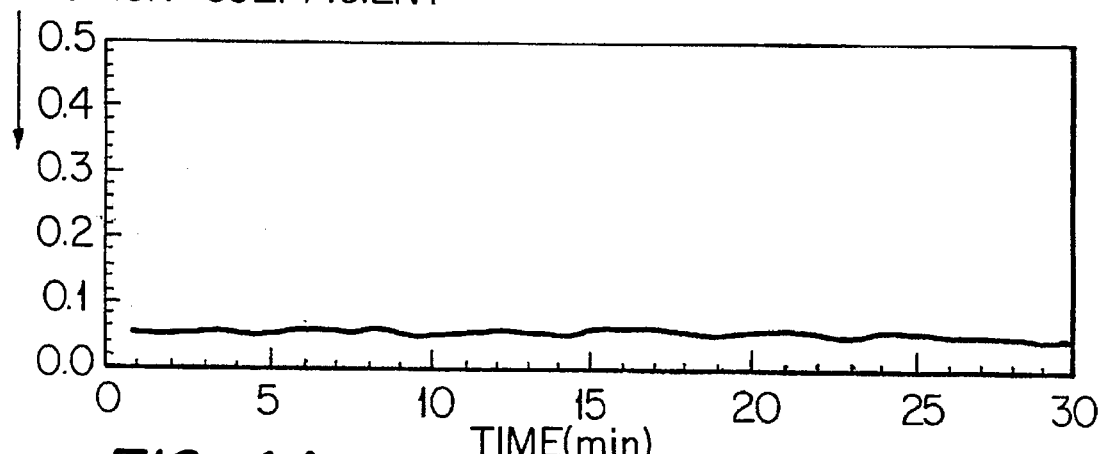
FIG. 1A is a graphical representation of the friction coefficient of a coated Ti—6Al—4V ball in contact with coated Ti—6Al—4V flats in polypropylene oxide lubricant in accordance with the invention.

In a first aspect, the present invention relates to a wear resistant coated titanium or titanium alloy. The coating includes two layers of material, a first layer of a titanium oxide and a second layer of cured epoxy resin bonded to the first layer of titanium oxide.

The titanium oxide layer may include titanium oxides of the formula $Ti_xO_y$ wherein x is 1-2 and y is 1-3. Preferably, this titanium oxide layer is an extremely thin surface layer of titanium dioxide.

The titanium oxide layer on the surface of the titanium or the titanium alloy serves as a cross-linking bridge to improve the adherence of the epoxy coating to the surface of the titanium or titanium alloy. The titanium oxide layer may be formed by conventional methods for the hydrolysis of a titanium orthoester. In particular, the surface of the titanium or the titanium alloy is treated with a tetraalkyl titanate in order to form a layer comprising titanium oxide on the surface of the titanium or titanium alloy. The tetraalkyl titanate may be, for example, tetra-n-butyl titanate and is typically employed in the form of a solution in an organic solvent such as heptane.

The titanium oxide layer is formed by subjecting a clean surface of the titanium or titanium alloy to immersion in the solution of tetraalkyl titanate, evaporating the solvent and hydrolyzing the remaining tetraalkyl titanate typically by the presence of moisture in the air to form a thin, dense network of a titanium oxide film. Once the titanium oxide layer has been applied, the coated substrate may be immersed in liquid epoxy resin to which an epoxy curing agent has been added. Typically, 20% by weight of the liquid resin mixture is curing agent.

Preferred epoxy resins which are useful in the present invention are 2–3 epoxypropylether epoxy resins such as N-butylglycidylether and 4,4'-isopropylidene-bis-phenyl diglycydylether. Other types of epoxy resins such as epoxy-novolac resins can be employed. Multi-functional resins containing two or four epoxy groups per molecule are preferred since they permit upgrading of thermal stability, chemical resistance and the electrical and mechanical properties of the coatings.

The epoxy curing agent to be employed may be selected from conventional epoxy agents for the particular epoxy that is employed in the coating. Thus, for glycydylethers, amine curing agents such as diethylene triamine, triethylene tetraamine and polyoxypropylene diamine may be employed. For epoxy-novolac resins a typical curing agent is 2-ethyl-4-methylimidazole. The best epoxy resins for the present invention are epoxy resins which are highly reactive towards the titanium oxide layer. In particular, 2,3-epoxypropyl resins are most preferred for this reason.

The two layer coating of titanium oxide and epoxy reduces wear and provides an excellent reduction in the friction coefficient. It is possible to further increase the wear resistance of the epoxy coating by adding a wear resistant filler material to the coating. Typical wear resistant filler materials are diamond powder, boron nitride powder, silicon carbide powder, corundum, ceramic wool, ceramic spheres, zinc oxide, alumosilicate, silica, titanium dioxide and alumina.

The wear resistant filler material may comprise 0.1–50 parts by weight, based on the weight of the epoxy coating, and more preferably comprises 1–5 parts by weight, based on the weight of the coating. The most preferred wear resistant filler material is diamond powder having a particle size of less than 1 micron.

In a second aspect, the present invention relates to a method for the protection of titanium and its alloys from severe wear and high friction under tribological conditions.

The method includes the steps of forming titanium oxide layer on the surface of the titanium or the titanium alloy, coating the titanium oxide layer with a composition comprising an epoxy resin and curing the epoxy resin. The materials employed to make the coating of the present invention may also be employed in the method of the present invention.

EXAMPLES 1–3 AND COMPARATIVE EXAMPLES A–D

A set of modified four-ball wear tests was used to evaluate the tribological properties of the coating of the present invention on titanium and its alloys. The modified four-ball wear tests employ a "BTF" (ball-on-three flats) geometry, that is, one Ti—6Al—4V alloy ball of 12.70 mm diameter is rotated on three stationary titanium flats of ASTM Grade 2 purity. The tests were conducted with the top ball rotating at 200 rpm (7.6 cm/sec) at room temperature. Each test lasted for 30 minutes. The wear scar diameters on the flats were measured by an optical microscope. The friction coefficients were calculated based on the recorded frictional torques, which were measured by a strain gauge attached to the wear tester.

The titanium flats of 6.35 mm diameter were polished to a "mirror surface" finish with a final thickness of 1.6 mm. Variation in thickness for the three flats was within 0.01 mm. Prior to each test, both the ball and the flats were thoroughly cleaned in an ultrasonic bath with hexane, acetone and 5% detergent in deionized water.

For pretreatment, the cleaned titanium specimen was first immersed into a 2% solution of TYZOR® TBT (tetra-n-butyl tinanate ex. Du Pont) in heptane. After evaporation of heptane, the TBT was quickly hydrolyzed by moisture in the air to form a thin, dense network of titanium dioxide film. Two brands of glycidyl resin, supplied by Buehler and Dow Chemical USA, respectively, were used for the coating. Buehler epoxy resin consists of bis-phenol A epoxy resin (i.e. 4,4'-isopropylidene-bis-phenyl diglycidyl ether) and n-butyl glycidyl ether. Coating of Buehler epoxy resin was conducted by immersing the above-described dioxide coated specimen into the liquid resin (⅕ resin weight of "Epo-Kwick™ Hardener" added). The hardener is a mixture of three amines (diethylenetriamine, triethylenetetramine and polyoxypropylenediamine). Cure was carried out at room temperature overnight. Dow Epoxy-Novolac (DEN) 431 and 438A85 resins contain 2.2 and 3.6 epoxy groups per molecule respectively. The multifunctionality permits upgrading of thermal stability, chemical resistance, and electrical and mechanical properties of bis-phenol A-epoxy polymers. Coating of DEN resins was carried out on a hot plate at about 100° C. and the curing agent used was EMI-24 (2-ethyl-4-methylimidazole). Final curing was carried out at 160° C. for 20 hours. In the latter case, a higher curing temperature of 160° C., rather than room temperature, was applied in order to achieve high thermal and chemical degradation stability and a higher heat deflection temperature.

Figure 1B:
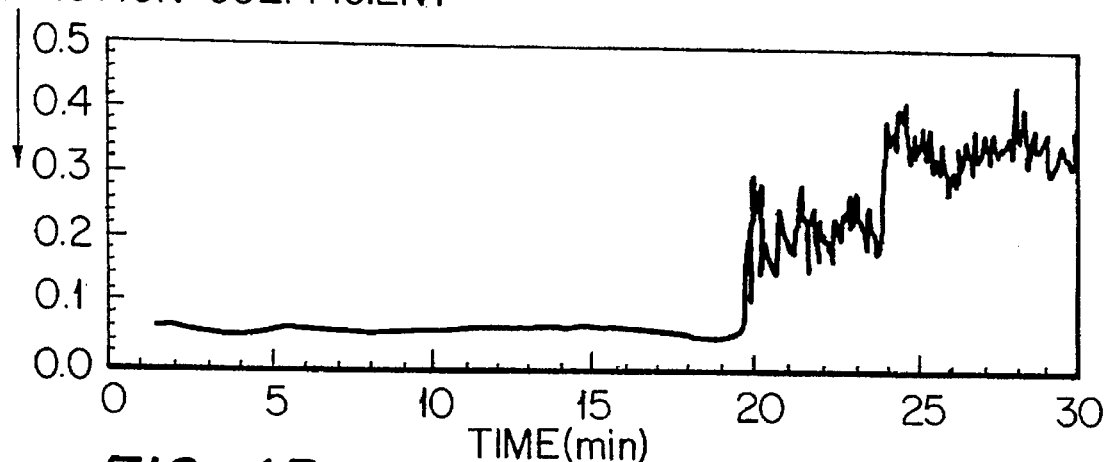
FIG. 1B is a graphical representation of the friction coefficient of an uncoated Ti—6Al—4V ball in contact with a coated Ti—6Al—4V flat using a polypropylene oxide lubricant.
Figure 1C:
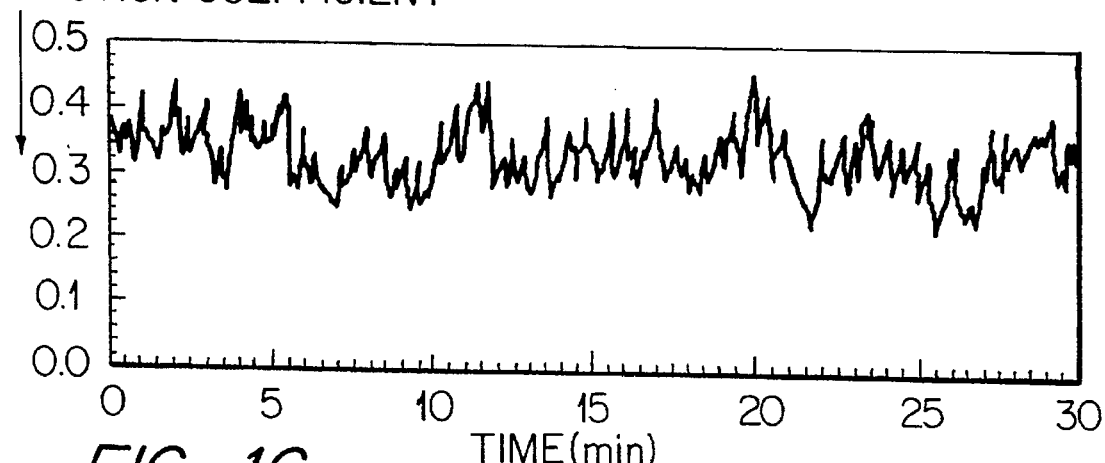
FIG. 1C is a graphical representation of the friction coefficient of an uncoated Ti—6Al—4V ball in contact with an uncoated Ti—6Al—4V flat using a polyphenylene oxide lubricant.

Coating of titanium and/or its alloys while using PPO as lubricant gave an extremely low wear with an extremely low friction coefficient (FC), greatly surpassing any test results of uncoated titanium flats with any lubricant, including the test with hexachloro-1,3-butadiene as lubricant (See Table 1). Comparing the recorded frictions in FIG. 1, the different tribological features between the coating and the uncoated Ti—6Al—4V ball to pure titanium are readily apparent. The severe "stick-slip" phenomenon in uncoated samples strongly indicated ineffectiveness of lubrication and a high propensity of titanium for galling and grooving.

TABLE 1

Four ball wear test result
(loading: 5 Kg/200 rpm/room temperature/30 min)

| Example | Ti-6Al-4V Ball | Ti (grade 2) Flats | Lubricant | WSD (mm) | FC |
|---|---|---|---|---|---|
| A | uncoated | uncoated | none (air) | 3.56 | 0.41 |
| B | uncoated | uncoated | poly(propylene glycol) | 2.37 | 0.35 |
| C | uncoated | uncoated | hexachloro-1,3-butadiene | 0.79 | 0.094 |
| D | uncoated | uncoated | PPO | 3.69 | 0.45 |
| 1 | uncoated | Buehler Epoxy-coated | PPO | 2.67 | 0.04(2') 0.16(3') 0.28(3') 0.35(17') |
| 2 | uncoated | Dow 438-A85 coated | PPO | 1.79 | 0.05(2') 0.21(4') 0.35(6') |
| 3 | Dow 438-A85 coated | Dow 438-A85 coated | PPO | 0 | 0.047 |

FC = Friction coefficient. For Examples 1–2, the friction coefficient is given at several time intervals.
PPO = Polypropylene oxide
WSD = Wear scar diameter
Ti-6Al-4V is a titanium, aluminum and vanadium alloy.

EXAMPLES 4–15

In order to dramatically extend the lifetime of the coating, 2% (by weight) of diamond powder with a particle size of 0.001 to 1 μm was added as anti-wear filler and dispersed in the DEN438A85 resin before curing. The mixture was then coated and cured on the surface of Grade 2 pure titanium flats. The degree of curing, however, decreases as powdered diamond is added due to decreased molecular motion caused by the absorption of resin molecules on the diamond surface. For a diamond-filled epoxy resin, an elevated curing temperature is particularly critical to promote complete curing. The maximum thickness of the coating was 0.25 mm. The ball to flats wear tests in a step-loading sequence showed that up to 295 hours of accumulated test time, when the durability test was terminated, for each loading step after reaching a steady state very low wear and a very low friction coefficient were essentially preserved. The results are given in Table 2.

TABLE 2

Results of durability test on Four Ball Wear Tester
(ball: uncoated Ti-6Al-4V; flats: ASTM grade 2 pure Ti
coated by Dow epoxy-novolac DEN438-A85 blended with
2% diamond powder (0–1 micron) anti-wear filler;
speed; 200 rpm/r.t./lubricant: PPO)

| Example | Loading (Kg) | Cumulative Time (hrs) | Friction Coefficient | WSD (mm) |
|---|---|---|---|---|
| 4 | 5 | 11 | 0.09 | 1.49 |
| 5 | 5 | 21 | 0.09 | 1.55 |
| 6 | 5 | 40 | 0.09 | 1.60 |
| 7 | 5 | 60 | 0.09 | 1.47 |
| 8 | 5 | 80 | 0.09 | 1.50 |
| 9 | 5 | 200 | 0.09 | 1.47 |
| 10 | 10 | 200 + 5 | 0.11 | 1.57 |
| 11 | 10 | 200 + 25 | 0.11 | 1.53 |

TABLE 2-continued

Results of durability test on Four Ball Wear Tester
(ball: uncoated Ti-6Al-4V; flats: ASTM grade 2 pure Ti
coated by Dow epoxy-novolac DEN438-A85 blended with
2% diamond powder (0–1 micron) anti-wear filler;
speed; 200 rpm/r.t./lubricant: PPO)

| Example | Loading (Kg) | Cumulative Time (hrs) | Friction Coefficient | WSD (mm) |
|---|---|---|---|---|
| 12 | 15 | 200 + 25 + 5 | 0.10 | — |
| 13 | 15 | 200 + 25 + 25 | 0.10 | 1.72 |
| 14 | 15 | 200 + 25 + 45 | 0.11 | 2.05 |
| 15 | 15 | 200 + 25 + 70 | 0.12 | 2.03 |

WSD = Wear sear diameter

The foregoing detailed description and examples were presented for the purposes of illustration and description only and are not be construed as limiting the invention in any way. The scope of the invention is to be determined by the claims appended hereto.

What is claimed is:

1. A friction and wear resistant coated titanium or titanium alloy which comprises:

(a) a titanium or titanium alloy substrate;

(b) a first layer of $Ti_xO_y$, wherein x is from 1–2 and y is from 1–3, bonded to a surface of said titanium or titanium alloy substrate; and (c) a second layer comprising a cured epoxy resin bonded to said first layer.

2. A coated titanium or titanium alloy as claimed in claim 1 wherein said substrate comprises at least 50% titanium and said first layer comprises a substantial amount of titanium dioxide.

3. A coated titanium or titanium alloy as claimed in claim 2 wherein said second layer comprises 0.1–50 parts by weight, based on the weight of the cured epoxy resin, of at least one wear resistant filler material.

4. A coated titanium or titanium alloy as claimed in claim 3 wherein the wear resistant filler material is selected from diamond powder, boron nitride powder, silicon carbide powder, corundum, ceramic wool, ceramic spheres, zinc oxide, bauxite, silica, titanium dioxide and alumina.

5. A coated titanium or titanium alloy as claimed in claim 4 wherein said second layer comprises 1–5 parts by weight, based on the weight of the cured epoxy resin, of diamond powder wear resistant filler having an average particle size of less than 1 micron.

6. A coated titanium or titanium alloy as claimed in claim 2 wherein said epoxy resin comprises a glycidyl ether.

7. A coated titanium or titanium alloy as claimed in claim 6 wherein said glycidyl ether is selected from n-butyl glycidyl ether and 4,4'-isopropylidene-bis-phenyl diglycidyl ether.

8. A coated titanium or titanium alloy as claimed in claim 2 wherein said first layer is formed by treating the titanium or titanium alloy with a tetraalkyl titanate.

9. A coated titanium or titanium alloy as claimed in claim 1 wherein said substrate comprises a material selected from titanium and the titanium alloy Ti—6Al—4V.

10. A method for producing a coated titanium or titanium alloy as claimed in claim 1 comprising the steps of:

(a) forming a $Ti_xO_y$ layer on the surface of the titanium or titanium alloy wherein x is from 1–2 and y is from 1–3;

(b) coating the $Ti_xO_y$ layer with a composition comprising an epoxy resin; and (c) curing the epoxy resin with an epoxy resin curing agent.

11. A method in accordance with claim 10 wherein the titanium or titanium alloy comprises at least 50% titanium and the $Ti_xO_y$ layer comprises titanium dioxide.

12. A method in accordance with claim 10 wherein the coating comprises 0.1–50 parts by weight, based on the weight of the coating, of a wear resistant filler material.

13. A method in accordance with claim 12 wherein the wear resistant filler material is selected from diamond powder, boron nitride powder, silicon carbide powder, corundum, ceramic wool, ceramic spheres, zinc oxide, bauxite, silica, titanium dioxide and alumina.

14. A method in accordance with claim 13 wherein the coating comprises 1–5 parts by weight, based on the weight of the coating, of a diamond powder wear resistant material having a particle size of less than 1 micron.

15. A method in accordance with claim 10 wherein step (a) comprises the step of treating the surface of the titanium or titanium alloy with a tetraalkyl titanate in order to form a layer comprising titanium dioxide on the surface of the titanium or titanium alloy.

16. A method in accordance with claim 10 wherein said epoxy resin comprises at least one glycidyl ether.

17. A method in accordance with claim 16 wherein the glycidyl ether comprises a compound selected from n-butyl glycidyl ether and 4,4'-isopropylidene-bis-phenyl diglycidyl ether.

18. A method in accordance with claim 17 wherein step (c) employs a curing agent which comprises 2-ethyl-4-methylimidazole and the tetraalkyl titanate employed in step (a) comprises tetra-n-butyl titanate.

19. A method in accordance with claim 17 wherein step (c) employs an acidic or basic curing agent for epoxy resins.

* * * * *